Feb. 13, 1940.   F. W. EDWARDS   2,190,059
INDICATING DEVICE FOR TUNING MECHANISMS
Filed May 24, 1939   2 Sheets-Sheet 1

INVENTOR.
FREDERICK W. EDWARDS.
BY Albert C. Bell
ATTORNEY.

Feb. 13, 1940. F. W. EDWARDS 2,190,059
INDICATING DEVICE FOR TUNING MECHANISMS
Filed May 24, 1939 2 Sheets-Sheet 2

INVENTOR.
FREDERICK W. EDWARDS.
BY Albert E. Bell
ATTORNEY.

Patented Feb. 13, 1940

2,190,059

UNITED STATES PATENT OFFICE 2,190,059

INDICATING DEVICE FOR TUNING MECHANISMS

Frederick W. Edwards, Chicago, Ill., assignor to Johnson Laboratories, Inc., Chicago, Ill., a corporation of Illinois Application May 24, 1939, Serial No. 275,369

25 Claims. (Cl. 116—124.1)

The invention pertains to improved mechanism for operating indicating devices for use in connection with the tuning of resonant circuits, so that with such tuning, the movement of the indicating mechanism or device will be greater at a desired portion of the indicating scale, than is said movement at another portion of the scale. The indicating mechanism referred to is particularly advantageous where permeability tuning is effected by the movement of ferromagnetic cores relatively to inductance coils, in such a manner that the core movement is substantially proportional to the angular movement of an operating shaft. For permeability tuning of the kind just referred to, different stations or frequencies of a tuning band in the mid-portion of the band, are not sufficiently separated on the indicating scale to make accurate tuning easy where the moving member of the indicating mechanism, for example a pointer, is operated proportionally to angular movement of the operating shaft of the tuning mechanism. The indicating mechanism of the present invention overcomes this difficulty by providing a substantially increased movement for the movable member of the indicating mechanism, throughout the mid-portion of the tuning range, for example, of the broadcast band, which is advantageous in that the spacing of the divisions of the scale of frequencies employed, is increased at the mid-portion of the scale, thereby greatly facilitating tuning operations.

In carrying out the invention, the operating shaft of the tuning mechanism is provided with a crank pivotally connected with a lever having sliding engagement with a fulcrum, said lever being connected at its free end with a pointer having rectilinear movement transversely of the length of the lever, and moving adjacent a scale indicating the tuned frequency of the tuned circuits at any time, which mechanism is effective in securing the advantageous results generally referred to above.

Figure 1:
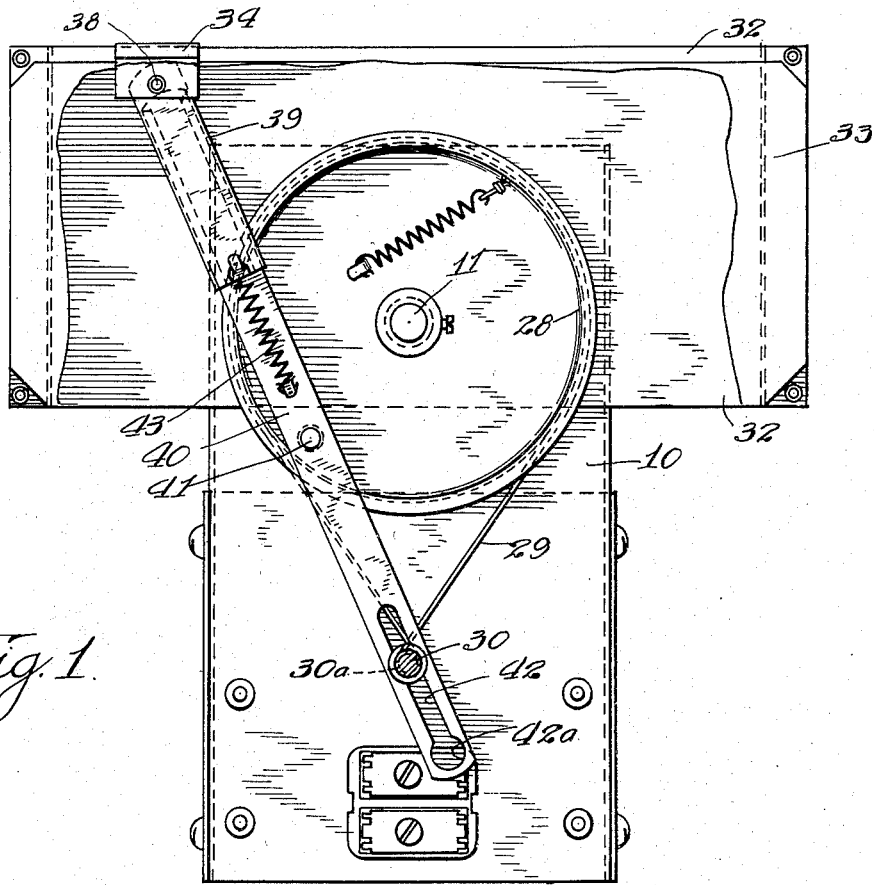
Figure 2:
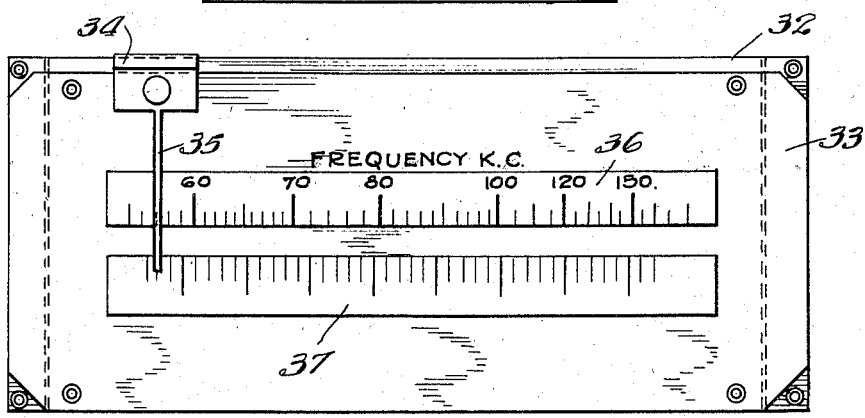
Figures 3, 4:
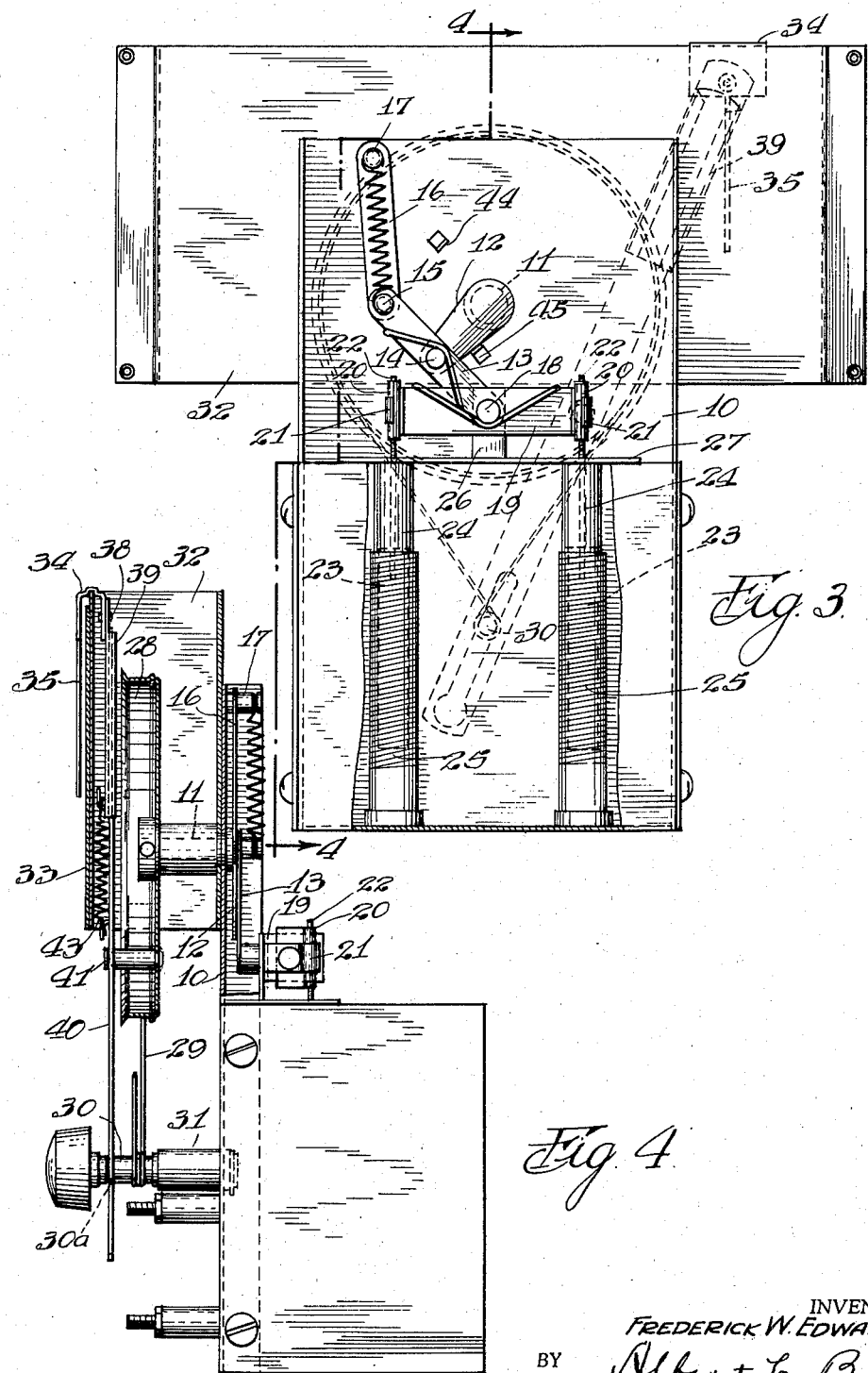

The invention will be best understood by reference to the accompanying drawings illustrating a preferred embodiment thereof, in which:

Fig. 1 illustrates a tuning unit equipped with the indicating mechanism referred to, in front elevation, the tuning scale being broken away to better show the operating mechanism of the indicating pointer of the device, Fig. 2 shows in front elevation the scale cooperating with the indicating pointer of the invention, Fig. 3 shows in back elevation the tuning unit illustrated in Fig. 1, and Fig. 4 is a vertical, sectional view of the construction shown in Fig. 3, taken along the line 4—4 in Fig. 3.

Similar numerals refer to similar parts throughout the several views.

As shown in Figs. 3 and 4, the tuning unit consists of a mounting plate 10 through the upper portion of which a shaft 11 extends, said shaft having secured to its rear end a crank 12 to which the mid-portion of a lever 13 is pivotally connected at 14, the upper end of said lever being pivotally connected at 15 with a link 16, the upper end of which is pivotally connected at 17 with a fixed support. For the arrangement of the parts shown, the link 16 occupies substantially a vertical position. The other end of the lever 13 is pivotally connected at 18 with a yoke 19 carrying sleeves 20 of thin insulating material, which are held in engagement with the yoke by spring clips 21. Slender threaded rods 22 extend through the sleeves 20 and are connected at their lower ends with ferromagnetic cores 23 contained with a sliding fit in vertically disposed insulating tubes 24 on which inductance coils 25 are wound. A vertically extending bar 26 is rigidly connected at its upper end with the yoke 19 and extends with sliding engagement through a horizontal plate 27 to restrain the yoke from horizontal movement, and as a result, when the shaft 11 is moved angularly, the cores 23 are correspondingly raised or lowered relatively to the inductance coils 25, to correspondingly tune the resonant circuits of which the inductance coils may be a part, it being understood that capacitors of fixed capacitance are connected with said coils to complete the said resonant circuits, although as is common in the art, said capacitors may be susceptible of a small amount of adjustment for aligning and tracking purposes.

The clips 21 hold the sleeves 20 with sufficient pressure against the threaded rods 22 and the yoke 19, so that the cores 23 are positively held in any adjusted position, and as a result of the sleeves being held in engagement with the threads on the rods, the rods and the cores connected with them, may be turned as desired to move the cores relatively to each other and to the coils 25 for adjustment purposes at any time.

The core operating mechanism described is advantageous because by means of it the threaded rods 22 have imparted to them substantially straight line vertical movement, by making the effective length of the crank 12 equal to the center to center distance from the pivotal connection 14 to the pivotal connection 18, and also equal to the center to center distance from the pivotal connection 14 to the pivotal connection 15 and locating said pivotal connections in line with each other, and with the pivotal connection 18 in vertical alignment with the center of the shaft 11.

As shown in Fig. 1, the shaft 11 has rigidly secured to its front end, a drum 28 having driving engagement by means of a cable or cord 29 with a spindle 30 mounted for rotation in a sleeve 31 secured to and extending forwardly from the mounting plate 10 as shown in Fig. 4. The spindle 30 is much smaller in diameter than the drum 28, so that a considerable angular movement of the spindle is required to move the shaft 11 from one angular tuning position to another, which is a desirable condition on account of the total angular movement of the shaft 11 being preferably not in excess of 90° with the construction of core operating mechanism described. The mounting plate 10 has secured to its upper portion a housing 32 which extends around the upper portion of the drum 28, and in front of said drum, to support a flat sheet of suitable material 33 on which the scales of the indicating mechanism are marked, as more clearly shown in Fig. 2. The upper forward edge of the housing 32 supports a U-shaped member 34 of sheet material for horizontal sliding movement, the forward portion of said member being extended downwardly, or otherwise carrying a pointer 35 for cooperation with scales 36 and 37 carried by the sheet 33. Within the housing 32, the member 34 is pivotally connected at 38 with the upper end portion of a flat sleeve 39 mounted for free sliding movement on the upper end portion of a lever 40 pivotally connected at its mid-portion 41 with a stud carried by the drum 28. The lower end portion of the lever 40 is slotted at 42 for sliding engagement with opposite sides of a corresponding groove 30a made in the spindle 30, so that said spindle will serve as a fulcrum for said lever, but that the lever may be moved longitudinally relative to said fulcrum. At its lower end, the slot 42 is enlarged as shown at 42a, to permit slipping the lever 42 over the end of the spindle 30 in assembling the parts. A spring 43 is connected at its ends with the lower portion of the sleeve 39 and with the lever 40, to move the sleeve 39 as far downwardly on the lever as the position at any time of the lever and the engagement of the member 34 with the upper edge of the housing 32, will permit. As a result of the construction described, the pivotal connection 41 is in effect a crank connection with the shaft 11, and rotation of the shaft moves the pivotal connection 41 angularly, thereby moving the lever 40 both angularly and vertically. It will be observed with the relation of the parts indicated in Fig. 1, that the movement of the pivotal connection 41 is through the lower quadrant of angular movement of the drum 28, and that the angular movement of the pivotal connection 41 is limited substantially to said quadrant by stops 44 and 45 formed from the mounting plate 10 and in the path of the crank 12 as shown in Fig. 3. With this relation of the parts, for uniform angular movement of the drum 28 and therefore of the shaft 11, angular movement of the lever 40 about its fulcrum support 30 is most rapid when the pivotal connection 41 is passing through the vertical line containing the centers of the shaft 11 and of the fulcrum 30 which is located directly below said shaft, because of the lever arm between the pivotal connection 41 and the fulcrum 30 then being shortest; also, that as the pivotal connection 41 moves to either side of the vertical line through the center of the shaft 11, the lever arm 41—30 lengthens, thereby decreasing the rate of angular movement of the lever 40 around the fulcrum 30. At the same time, the effective lever arm 41—38 which operates the slide member 34, shortens. The variation in the rate of angular movement of the lever 40, and the change in effective length of the lever arm 41—38, cooperate with the tuning effected by the uniform and substantially proportional movement of the cores 23 relatively to angular movement of the shaft 11, to produce a substantially greater separation of the scale divisions of the frequency scale 36 at the mid-portion of said scale, than is the case at the end portions of the scale, which is a condition much to be desired in some cases. A further factor contributing to this end, is the change in the effective operating length of the crank arm 11—41 of the drum 28, so the pivot 41 is moved from its position in line with the shaft 11 and the fulcrum pivot 30, for it will be observed that as the pivot 41 departs from said condition of alignment, for uniform angular movement of the drum 28, the effective crank arm which imparts angular movement to the lever 40 about the fulcrum pivot 30, progressively decreases and more rapidly than proportionally to the angular movement of the drum 28. The scale 37 may be graduated to any other desired function of the tuning, for example it may afford an indication of the wave lengths for any desired tuned conditions. From the above it will appear that the invention provides a simple, inexpensive and convenient arrangement for facilitating the more accurate tuning of frequencies or stations in one portion of the tuning range, than the frequencies or stations in another portion or portions of that range. It will be understood that equivalent lever mechanisms may be used to effect the wider separation of the scale divisions and greater movement of the pointer at one part of the scale than another, the requirement being in this connection that for equal amounts of movement of the operating crank from alignment with the operated lever, the ratio to each other of the effective lever arms of the operated lever shall change to produce progressively less pointer movement, preferably by changing the length of both of the effective lever arms of the operated lever, it being also desirable at the same time to decrease the effective length of the crank.

It will be understood that the indicating mechanism described, although illustrated in connection with mechanism for tuning resonant circuits by means of inductance variations, effected by moving ferromagnetic cores relatively to associated inductance coils to change the permeability of the coils as may be required to produce said inductance variations, may be used in connection with any type or kind of tuning mechanism capable of being operated by a rotary shaft, whether the tuning is effected by permeability changes, or more generally by inductance changes, or in any other manner.

It will also be understood that, although by the illustrative structure shown in the drawings, the divisions of the mid-portion of the scale 36 are spread as described, other desired portions of the scale divisions may be similarly spread if preferred, by locating the fulcrum 30 on one side or the other of a vertical line through the shaft 11, for the structure shown in Fig. 1, the only requisite being that when the shaft 11, the connection 41 and the fulcrum 30 are in alignment, the pointer 35 shall be adjacent the portion of the scale where the greatest spread of the scale divisions is desired. If preferred, a similar shifting of the spread portion of the scale divisions may be effected without changing the position of the fulcrum 30 shown in Fig. 1, by changing the position of the scale relatively to the mounting plate 10; or, without changing the illustrated positions of the fulcrum 30 and of the scale, a different angle or quadrant of the drum 28 may be employed from that illustrated. Thus the operating angle or quadrant of the pivotal connection 41 may have different angular relations and positions relatively to the scale 36, depending in any case upon where on the scale the greatest spread of scale divisions is desired. In Fig. 2, the numerals appearing on the scale 36 are used with their commonly accepted significance, each being one-tenth of the actual frequency of tuning in kilocycles, or in other words the scale covers a range of from somewhat less than 600 kilocycles to somewhat more than 1500 kilocycles.

While I have shown my invention in the particular embodiment above described, it will be understood that I do not limit myself thereto as I may employ equivalents thereof without departing from the scope of the appended claims.

Having thus described my invention, what I claim is:

1. In an indicating mechanism, the combination of a rotary drum, a tuning shaft secured to said drum, a lever extending across said drum and movable in a plane substantially parallel with said drum, a pivotal connection between the mid-portion of said lever and an off-center portion of said drum, a fixed pivot having sliding connection with one end portion of said lever, a pointer carried by the other end portion of said lever, and a fixed scale cooperating with said pointer.

2. In an indicating mechanism, the combination of a rotary drum, a tuning shaft secured to said drum, a lever extending across said drum and movable in a plane substantially parallel with said drum, a pivotal connection between the mid-portion of said lever and an off-center portion of said drum, a fixed pivot having sliding connection with one end portion of said lever, a scale mounting having a straight edge and a straight scale substantially parallel with said edge, a pointer mounted for sliding movement on said mounting edge and cooperating with said scale, and an operating connection between said pointer and the other end portion of said lever.

3. In an indicating mechanism, the combination of a rotary drum, a tuning shaft secured to said drum, a lever extending aross said drum and movable in a plane substantially parallel with said drum, a pivotal connection between the mid-portion of said lever and an off-center portion of said drum, a fixed pivot having sliding connection with one end portion of said lever, a scale mounting having a straight edge and a straight scale substantially parallel with said edge, a pointer mounted for sliding movement on said mounting edge and cooperating with said scale, and an operating connection between said pointer and the other end portion of said lever, the operating connection of said pointer including a member slidably mounted on said lever and pivotally connected with said pointer.

4. In an indicating mechanism, the combination of a rotary drum, a tuning shaft secured to said drum, a lever extending across said drum and movable in a plane substantially parallel with said drum, a pivotal connection between the mid-portion of said lever and an off-center portion of said drum, a fixed pivot having sliding connection with one end portion of said lever, a scale mounting having a straight edge and a straight scale substantially parallel with said edge, a pointer mounted for sliding movement on said mounting edge and cooperating with said scale, and an operating connection between said pointer and the other end portion of said lever, the operating connection of said pointer including a member slidably mounted on said lever and pivotally connected with said pointer, and a spring engaging said lever and said slidable member and holding said pointer in engagement with said mounting edge.

5. In an indicating mechanism, the combination of a rotary drum, a tuning shaft secured to said drum, a lever extending across said drum and movable in a plane substantially parallel with said drum, a pivotal connection between the mid-portion of said lever and an off-center portion of said drum, a fixed pivot having sliding connection with one end portion of said lever, a scale mounting having a straight edge and a straight scale substantially parallel with said edge, a pointer mounted for sliding movement on said mounting edge and cooperating with said scale, an operating connection between said pointer and the other end portion of said lever, and a spring holding said pointer in engagement with said mounting edge.

6. In an indicating mechanism, the combination of a rotary drum, a tuning shaft secured to said drum, a lever extending across said drum and movable in a plane substantially parallel with said drum, a pivotal connection between the mid-portion of said lever and an off-center portion of said drum, a fixed pivot having sliding connection with one end portion of said lever, a pointer operated by the other end portion of said lever, and a fixed scale cooperating with said pointer, said fixed pivot comprising a driving spindle of small diameter relatively to said drum, and driving connections between said spindle and said drum.

7. In an indicating mechanism, the combination of a rotary drum, a tuning shaft secured to said drum, a lever extending across said drum and movable in a plane substantially parallel with said drum, a pivotal connection between the mid-portion of said lever and an off-center portion of said drum, a fixed pivot having sliding connection with one end portion of said lever, a pointer operated by the other end portion of said lever, and a fixed scale cooperating with said pointer, said fixed pivot comprising a driving spindle of small diameter relatively to said drum, and a cable connecting said spindle with said drum to drive the latter.

8. In an indicating mechanism, the combination of a rotary drum, a tuning shaft secured to said drum, a lever extending across said drum and movable in a plane substantially parallel with said drum, a pivotal connection between the mid-portion of said lever and an off-center portion of said drum, a fixed pivot having sliding connection with one end portion of said lever, a pointer operated by the other end portion of said lever, and a fixed scale cooperating with said pointer, said fixed pivot comprising a driving spindle of small diameter relatively to said drum, and driving connections between said spindle and said drum, said one end portion of said lever having a longitudinal slot in sliding engagement with opposite sides of said spindle.

9. In an indicating mechanism, the combination of a rotary drum, a tuning shaft secured to said drum, a lever extending across said drum and movable in a plane substantially parallel with said drum, a pivotal connection between the mid-portion of said lever and an off-center portion of said drum, a fixed pivot having sliding connection with one end portion of said lever, a pointer operated by the other end portion of said lever, and a fixed scale cooperating with said pointer, said one end portion of said lever having a longitudinal slot in sliding engagement with opposite sides of said fixed pivot.

10. In an indicating mechanism, the combination of a rotary shaft, a crank carried by said shaft, a lever pivotally connected at its mid-portion with said crank, a fixed pivot connected with one end portion of said lever, a pointer operated by the other end portion of said lever, and a scale cooperating with said pointer and showing values of a desired function of rotation of said shaft, a guide for said pointer extending substantially parallel with said scale, said scale being straight and said pointer having straight line movement substantially parallel with said scale.

11. In an indicating mechanism, the combination of a rotary shaft, a crank carried by said shaft, a lever pivotally connected at its mid-portion with said crank, a fixed pivot connected with one end portion of said lever, a pointer operated by the other end portion of said lever, and a scale cooperating with said pointer and showing values of a desired function of rotation of said shaft, said fixed pivot having movable engagement with and longitudinally of said lever.

12. In an indicating mechanism, the combination of a rotary shaft, a crank carried by said shaft, a lever pivotally connected at its mid-portion with said crank, a fixed pivot connected with one end portion of said lever, a pointer operated by the other end portion of said lever, and a scale cooperating with said pointer and showing values of a desired function of rotation of said shaft, said one end portion of said lever being slotted and having sliding engagement with opposite sides of said fixed pivot.

13. In an indicating mechanism, the combination of a rotary shaft, a crank carried by said shaft, a lever pivotally connected at its mid-portion with said crank, a fixed pivot connected with one end portion of said lever, a scale mounting having a straight scale thereon, said scale mounting having a pointer guide substantially parallel with said scale, a pointer mounted for sliding movement on said guide and cooperating with said scale, and an operating connection between said pointer and the other end portion of said lever.

14. In an indicating mechanism, the combination of a rotary shaft, a crank carried by said shaft, a lever pivotally connected at its mid-portion with said crank, a fixed pivot connected with one end portion of said lever, a scale mounting having a straight scale thereon, said scale mounting having a pointer guide substantially parallel with said scale, a pointer mounted for sliding movement on said guide and cooperating with said scale, and an operating connection between said pointer and the other end portion of said lever, the operating connection of said pointer including a member slidably mounted on said lever and pivotally connected with said pointer.

15. In an indicating mechanism, the combination of a rotary shaft, a crank carried by said shaft, a lever pivotally connected at its mid-portion with said crank, a fixed pivot connected with one end portion of said lever, a scale mounting having a straight edge and a straight scale substantially parallel with said edge, a pointer mounted for sliding movement on said mounting edge and cooperating with said scale, and an operating connection between said pointer and the other end portion of said lever.

16. In an indicating mechanism, the combination of a rotary shaft, a crank carried by said shaft, a lever pivotally connected at its mid-portion with said crank, a fixed pivot connected with one end portion of said lever, a scale mounting having a straight edge and a straight scale substantially parallel with said edge, a pointer mounted for sliding movement on said mounting edge and cooperating with said scale, and an operating connection between said pointer and the other end portion of said lever, the operating connection of said pointer including a member slidably mounted on said lever and pivotally connected with said pointer.

17. In an indicating mechanism, the combination of a rotary shaft, a crank carried by said shaft, a lever pivotally connected at its mid-portion with said crank, a fixed pivot connected with one end portion of said lever, a scale mounting having a straight edge and a straight scale substantially parallel with said edge, a pointer mounted for sliding movement on said mounting edge and cooperating with said scale, and an operating connection between said pointer and the other end portion of said lever, the operating connection of said pointer including a member slidably mounted on said lever and pivotally connected with said pointer, and a spring engaging said lever and said slidable member and holding said pointer in engagement with said mounting edge.

18. In an indicating mechanism, the combination of a rotary drum, a tuning shaft secured to said drum, a lever extending across said drum and movable in a plane substantially parallel with said drum, said lever including first and second portions movable longitudinally relatively to each other, a first pivot engaging said first lever portion and carried by an off-center portion of said drum, a second pivot having fixed support and also engaging said first lever portion, one of said first and second pivots having sliding engagement with and longitudinally of said first lever portion, a scale mounting having a straight edge and a straight scale substantially parallel with said edge, a pointer mounted for sliding movement on said mounting edge and cooperating with said scale, and a third pivot connecting said pointer with the second portion of said lever.

19. In an indicating mechanism, the combination of a rotary drum, a tuning shaft secured to said drum, a lever extending across said drum and movable in a plane substantially parallel with said drum, said lever including first and second portions movable longitudinally relatively to each other, a first pivot engaging said first lever portion and carried by an off-center portion of said drum, a second pivot having a fixed support and also engaging said first lever portion, one of said first and second pivots having sliding engagement with and longitudinally of said first lever portion, a fixed scale, a pointer guide for said scale, a pointer movable on said guide and cooperating with said scale, and a third pivot connecting said pointer with the second portion of said lever.

20. In an indicating mechanism, the combination of a rotary drum, a tuning shaft secured to said drum, a lever extending across said drum and movable in a plane substantially parallel with said drum, said lever including first and second portions movable longitudinally relatively to each other, a first pivot engaging said first lever portion and carried by an off-center portion of said drum, a second pivot having fixed support and also engaging said first lever portion, one of said first and second pivots having sliding engagement with and longitudinally of said first lever portion, a scale mounting having a straight edge and a straight scale substantially parallel with said edge, a pointer mounted for sliding movement on said mounting edge and cooperating with said scale, a third pivot connecting said pointer with the second portion of said lever, and a spring holding said pointer in engagement with said mounting edge.

21. In an indicating mechanism, the combination of a rotary drum, a tuning shaft secured to said drum, a lever extending across said drum and movable in a plane substantially parallel with said drum, said lever including first and second portions movable longitudinally relatively to each other, a first pivot engaging said first lever portion and carried by an off-center portion of said drum, a second pivot having a fixed support and also engaging said first lever portion, one of said first and second pivots having sliding engagement with and longitudinally of said first lever portion, a fixed scale, a pointer guide for said scale, a pointer movable on said guide and cooperating with said scale, a third pivot connecting said pointer with the second portion of said lever, and a spring tending to move said lever portions relatively to each other to change the effective length of an arm of said lever.

22. In an indicating mechanism, the combination of a rotary shaft, a crank carried by said shaft, a first pivot carried by said crank, a second pivot having fixed support, a scale showing values of a desired function of rotation of said shaft, a pointer supported for movement relatively to and cooperating with said scale, a third pivot carried by said pointer, and lever mechanism connecting said three pivots to operate said pointer by angular movement of said shaft, said lever mechanism having conformations and including parts movable relatively to said pivots to change the spacing of said pivots from each other by angular movement of said shaft, a first position of said lever mechanism for a first angular position of said crank producing a relatively small spacing of said first and second pivots and a relatively large spacing of said first and third pivots, and a second position of said lever mechanism for a second angular position of said crank producing an increased spacing of said first and second pivots and a decreased spacing of said first and third pivots, whereby the pointer movement on the scale for a given amount of angular movement of the shaft for the first position of said lever mechanism is substantially greater than it is for the second position of said lever mechanism and the same amount of angular movement of the shaft.

23. In an indicating mechanism, the combination of a rotary shaft, a crank carried by said shaft, an operating pivot carried by said crank, a fulcrum pivot having fixed support, a scale showing values of a desired function of rotation of said shaft, a pointer supported for movement relatively to and cooperating with said scale, an operated pivot carried by said pointer, and lever mechanism connecting said pivots and having variable relation thereto, a first position of said lever mechanism for a first angular position of said crank producing a first lever arm between said operating pivot and said fulcrum pivot and a second lever arm between said fulcrum pivot and said operated pivot, and a second position of said lever mechanism for a second angular position of said crank producing an increase in length of said first lever arm and a smaller increase in length of said second lever arm, whereby the pointer movement on the scale for a given amount of angular movement of the shaft for the first position of said lever mechanism is substantially greater than is said pointer movement for the second position of said lever mechanism and the same amount of angular movement of the shaft.

24. In an indicating mechanism, the combination of a rotary shaft, a crank carried by said shaft, a first pivot carried by said crank, a second pivot having fixed support, a scale showing values of a desired function of rotation of said shaft, a pointer supported for movement relatively to and cooperating with said scale, a third pivot carried by said pointer, and lever mechanism connecting said three pivots to operate said pointer by angular movement of said shaft, said lever mechanism having conformations and including parts movable relatively to said pivots to change the spacing of said pivots from each other by angular movement of said shaft, a first position of said lever mechanism for a first angular position of said crank producing a relatively small spacing of said first and second pivots and a relatively large spacing of said first and third pivots, and a second position of said lever mechanism for a second angular position of said crank producing an increased spacing of said first and second pivots and a decreased spacing of said first and third pivots, whereby the pointer movement on the scale for a given amount of angular movement of the shaft for the first position of said lever mechanism is substantially greater than it is for the second position of said lever mechanism and the same amount of angular movement of the shaft, said crank having a smaller effective operating arm for its said second angular position than it has for its said first angular position.

25. In an indicating mechanism, the combination of a rotary shaft, a crank carried by said shaft, an operating pivot carried by said crank, a fulcrum pivot having fixed support, a scale showing values of a desired function of rotation of said shaft, a pointer supported for movement relatively to and cooperating with said scale, an operated pivot carried by said pointer, and lever mechanism connecting said pivots and having variable relation thereto, a first position of said lever mechanism for a first angular position of said crank producing a first lever arm between said operating pivot and said fulcrum pivot and a second lever arm between said fulcrum pivot and said operated pivot, and a second position of said lever mechanism for a second angular position of said crank producing an increase in length of said first lever arm and a smaller increase in length of said second lever arm, whereby the pointer movement on the scale for a given amount of angular movement of the shaft for the first position of said lever mechanism is substantially greater than is said pointer movement for the second position of said lever mechanism and the same amount of angular movement of the shaft, said crank having a smaller effective operating arm for its said second angular position than it has for its said first angular position.

FREDERICK W. EDWARDS.